(12) United States Patent
Ting

(10) Patent No.: US 6,178,297 B1
(45) Date of Patent: Jan. 23, 2001

(54) CAMERA WITH LASER VIEW FRAMING FUNCTION

(75) Inventor: Chih-Yu Ting, Taipei (TW)

(73) Assignee: Opcom, Inc., Taipei (TW)

( * ) Notice: Under 35 U.S.C. 154(b), the term of this patent shall be extended for 0 days.

(21) Appl. No.: 09/195,144

(22) Filed: Nov. 18, 1998

(51) Int. Cl.$^7$ .................................................. G03B 13/00
(52) U.S. Cl. .......................................................... 396/431
(58) Field of Search .......................... 396/431; 352/131, 352/170, 171

(56) References Cited

U.S. PATENT DOCUMENTS 5,059,019 * 10/1991 McCullough ........................ 352/131
5,694,632 * 12/1997 Capper ................................. 396/431
5,752,115 * 5/1998 McIntyre et al. .................... 396/431

* cited by examiner

Primary Examiner—W. B. Perkey
(74) Attorney, Agent, or Firm—A & J

(57) ABSTRACT

A camera with laser view framing function includes a housing that is provided with a laser generated near a lens of the camera. The laser generator has a beam emitting hole that is oriented substantially the same direction as the lens. The housing is formed with a window on a wall that corresponds to the beam emitting hole. A shade having a frame profile through hole is insertably provided in the window. A switch key for actuating the laser generating is projectingly provided on the housing. When the switch key is pressed, the laser generator is actuated to emit a laser beam, which passes through the frame profile through hole of the shade to form a profile light frame framing an area of which a user is taking a picture.

2 Claims, 3 Drawing Sheets

CAMERA WITH LASER VIEW FRAMING FUNCTION

BACKGROUND OF THE INVENTION

1. Field of the Invention

The present invention relates generally to a camera having laser view framing function, and more particularly to a camera in which the user need not put his/her eyes closely to the camera to observe the range of the view to be taken when taking pictures.

2. Description of the Prior Art

With the advance of technologies, various kinds of electronic multi-function cameras have been developed. Digital cameras can be connected to computers and printers to print out the pictures taken. There is no need to go to a photo lab to have the films processed, developed and printed.

However, the user still needs to look through the viewfinder closely when taking a picture (in the case of a digital camera, the user has to look at the liquid crystal display) so that he/she can frame the object he/she wants to take a picture of, determine the range of the view and focus. The user also has to adjust the angle of the camera and depth of the field, etc.

With such a view-finding structure, as the user has to look attentively at the small viewfinder or the liquid crystal display, it is eye straining and time-consuming. It will not be very inconvenient to take a view if it is substantially at the eye level. But if the view to be taken is far above or below the eye level, and in order to achieve a best effect, the user cannot tilt the camera upwardly or downwardly and has to shoot the picture with the camera in a normal upright position, he/she may need to bend or stand on a chair to try catch the view, which is very troublesome.

SUMMARY OF THE INVENTION

According to the first aspect of the present invention, a camera with laser view framing function is provided with a laser generator near the lens. The laser generator has a laser beam hole provided with a shade having a frame profile through hole so that the laser beam emitted by the laser generator has the profile of a frame that frames the area of which a user is taking a picture. Hence, the user need not put his/her eyes closely to the camera to observe the range of the view to be taken. He/she may simply look at the area framed by the laser beam to know the range of the view.

According to the second aspect of the present invention, the laser beam frame generated by the laser generator is enlarged and projected around the object to be taken. Therefore, the view is very clear. If the object is far below or above the user's eye level, the user can simply hold the camera up or down at a suitable position while kneeling or squatting, without the need to bend or stand on other objects. He/she can easily judge the range of the view by looking at the framed area.

According to the third aspect of the present invention, the shade at the front end of the laser generator can diffuse the laser beam to a safety limit value that will not harm the human body. Even if the laser beam is projected on a person of whom a picture is to be taken, it will not harm the person. Use of the present invention is therefore safe.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
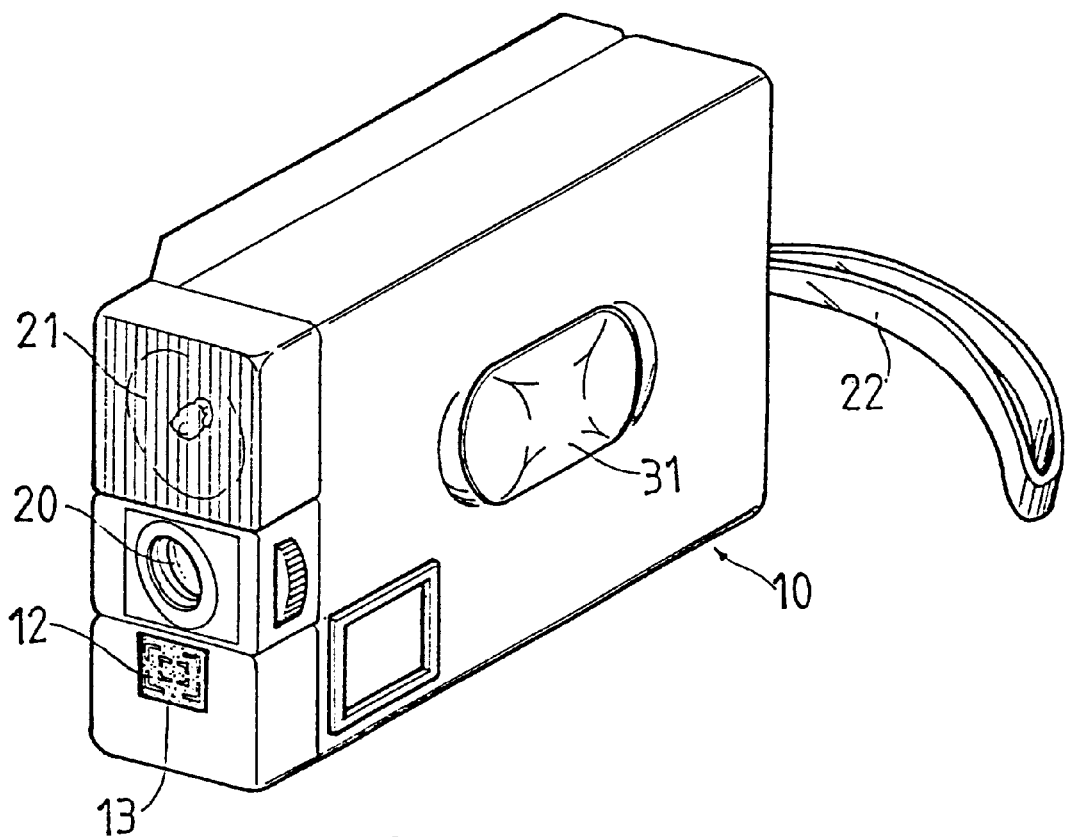
FIG. 1 is a perspective view of the camera according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
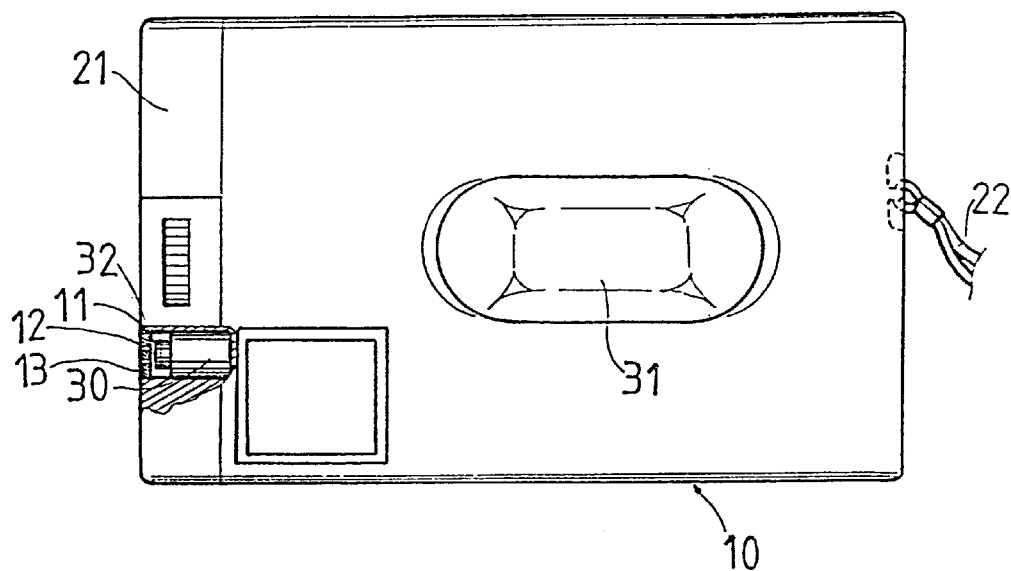
FIG. 2 is a sectional view of the laser emitting portion of the camera according to the present invention.
Figure 3:
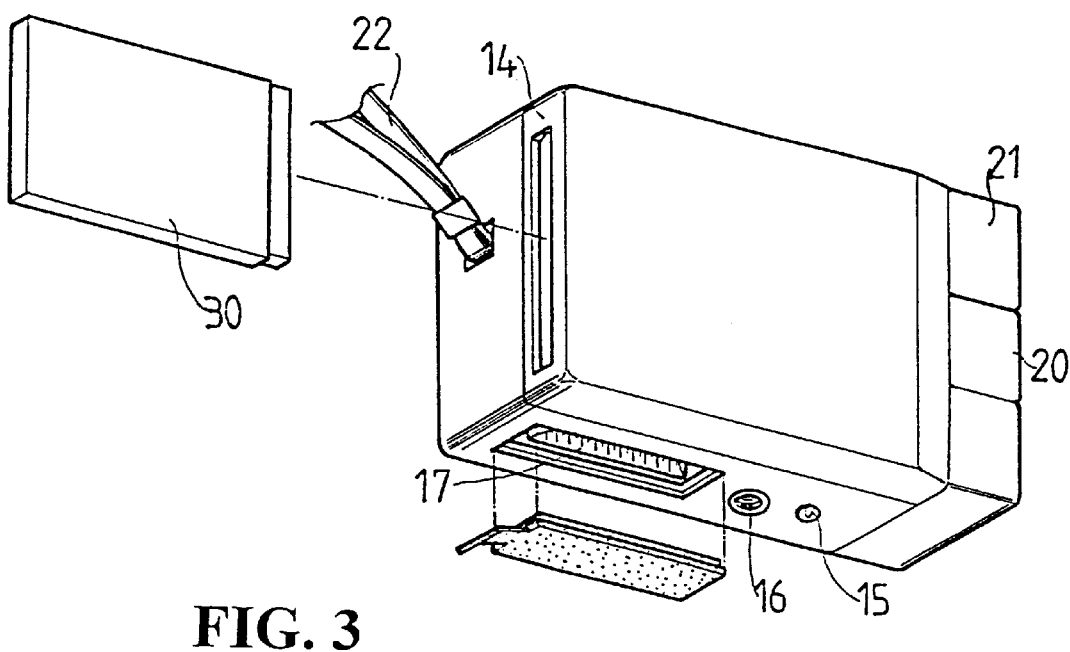
FIG. 3 illustrates an embodiment of the connecting end of the camera according to the present invention.

The present invention is described using digital cameras as examples. With reference to FIGS. 1 and 2, one side of the camera is provided with a lens 20 and a flash 21. An attachment loop 22 is provided on the camera at a suitable position. Within a housing 10 of the camera and near the lens 20, there is provided a laser generator 30. The laser generator 30 has a beam emitting hole 32, which is oriented substantially in the same direction as the lens 20. A window 11 is formed on the housing 10 corresponding to the beam emitting port 32 of the laser generator 30. A shade 13 having a frame profile through hole 12 is insertably provided in the window 11. A key switch 31 is projectingly provided on the housing 10 at a suitable position to start the laser generator 30. The key switch 31 may be a two-stage contact type switch. When the key switch 31 is pressed lightly for the first time, the laser generator 30 is connected to electricity, and when the key switch 31 is pressed for the second time, the lens 20 is connected to electricity as well. Referring to FIG. 3, the housing 10 is shown to have the lens 20, the flash 21, and the shade 13 on the same wall. On the other walls of the housing 10, there are provided a casing 14 of an electronic data memory card 30 (such as PCMICA II CARD), a direct current jack 15, a tripod connecting screw hole 16, and a RS232 connector 17. The electronic data memory card 30 can be inserted into the camera and can store about 40 pictures. The electronic data memory card 30 can be removed and connected directly to a computer and a printer to print out the pictures stored in the memory card 30. Alternatively, an RS232 connecting wire may be used to connect the RS232 connector 17 and the RS232 connecting end of the computer to proceed with on-line image output, and the direct current jack 15 is connected to an output connector of an AC-DC converter to supply external electric power to the camera. The camera can also be supported by the tripod using a standard screw rod to lock into a connecting screw hole of the tripod.

Figure 4:
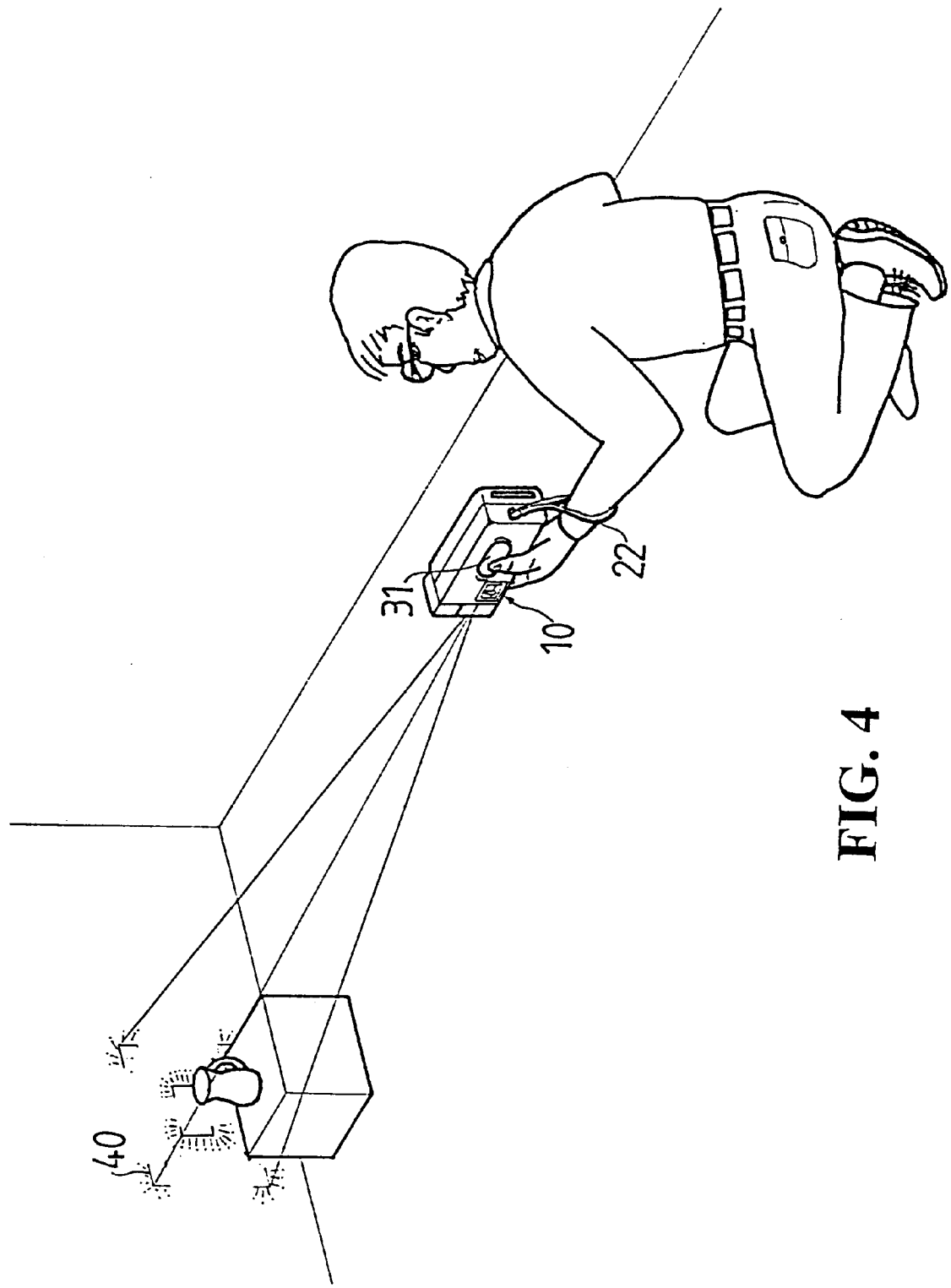
FIG. 4 is a schematic view illustrating operation of the camera according to the present invention.

Referring to FIG. 4, which is a schematic illustrating the operation of the present invention, the user holds the housing 10 in one hand and presses the switch key 31. The emitted laser beam passes through the above-mentioned frame profile through hole 12 of the shade 13 onto the background of the area the user is taking a picture of, forming a profile light frame framing the area the user is taking a picture of. Hence, the user needs not put his eyes near the camera to observe the objects within the area of which he is taking a picture. The user can simply observe the profile light frame 40 formed by the laser beam to know the range of the view. It can therefore be appreciated that the taking of views is quicker and more convenient.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A camera with laser view framing function, comprising a housing that is provided with a laser generated near a lens of said camera, said laser generator having a beam emitting hole that is oriented substantially the same direction as said lens, said housing being formed with a window on a wall that corresponds to said beam emitting hole, a shade having a frame profile through hole being insertably provided in said window, a switch key for actuating said laser generating being projectingly provided on said housing, whereby when said switch key is pressed, said laser generator is actuated to emit a laser beam which passes through said frame profile through hole of said shade to form a profile light frame framing an area of which a user is taking a picture.

2. The camera with laser view framing function as claimed in claim 1, wherein said switch key is a two-stage press type switch key in which when said switch key is pressed for the first time, said laser generator is connected to electricity, and when said switch key is pressed for the second time, said lens of said camera is connected to electricity.

* * * * *